(12) United States Patent  (10) Patent No.: US 7,778,118 B2
Lyons et al.  (45) Date of Patent: Aug. 17, 2010

(54) WATCH DEVICE HAVING TOUCH-BEZEL USER INTERFACE

(75) Inventors: Justin R. Lyons, Olathe, KS (US); Kristin M. Massoth, Prairie Village, KS (US); John H. Lovitt, Spring Hill, KS (US); Claudette D. Stevenson, Wilsonville, OR (US); David J. Downey, Louisburg, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 12/055,978

(22) Filed: Mar. 26, 2008

(65) Prior Publication Data

US 2009/0059730 A1  Mar. 5, 2009

Related U.S. Application Data

(60) Provisional application No. 60/968,517, filed on Aug. 28, 2007, provisional application No. 61/018,647, filed on Jan. 2, 2008.

(51) Int. Cl.
*G04C 17/00* (2006.01)

(52) U.S. Cl. .................................................. 368/69

(58) Field of Classification Search ............... 368/69, 368/71, 72, 75
See application file for complete search history.

(56) References Cited

U.S. PATENT DOCUMENTS

| | | | | |
|---|---|---|---|---|
| 5,453,960 | A | | 9/1995 | Teres et al. ................ 368/69 |
| 5,559,761 | A | * | 9/1996 | Frenkel et al. ............. 368/69 |
| 6,052,339 | A | * | 4/2000 | Frenkel et al. ........... 368/230 |
| 6,356,512 | B1 | * | 3/2002 | Martin et al. ............. 368/10 |
| 6,542,120 | B1 | * | 4/2003 | Gilbertson .............. 342/419 |
| 6,556,222 | B1 | | 4/2003 | Narayanaswami ........ 345/786 |
| 6,837,827 | B1 | | 1/2005 | Lee et al. ................... 482/8 |
| 6,868,046 | B2 | | 3/2005 | Farine et al. ............. 368/28 |
| 6,914,564 | B2 | * | 7/2005 | Barras et al. .......... 343/700 MS |
| 6,990,047 | B1 | * | 1/2006 | Barbagiovanni et al. .... 368/10 |
| 7,046,230 | B2 | | 5/2006 | Zadesky et al. .......... 345/156 |
| 7,081,905 | B1 | | 7/2006 | Raghunath .............. 345/684 |
| 7,428,191 | B1 | * | 9/2008 | Klein ..................... 368/82 |
| 2005/0001821 | A1 | * | 1/2005 | Low ...................... 345/169 |
| 2006/0139320 | A1 | * | 6/2006 | Lang ..................... 345/156 |

FOREIGN PATENT DOCUMENTS

KR  10-2001-0050157  3/2005

OTHER PUBLICATIONS

Garmin's Forerunner® 205/305 Owner's Manual, published Jan. 2006.
Van Buskirk, Eliot; Perspective: The secret of iPod's scroll wheel; CNET News.com; 3 pages; published Sep. 22, 2004.

(Continued)

*Primary Examiner*—Edwin A. Leon
(74) *Attorney, Agent, or Firm*—Samuel M. Korte

(57) ABSTRACT

A watch device includes a touch-sensitive user interface employing a sensor positioned within the bezel of the display for detecting when the bezel is touched by a user of the watch device. The sensor may be capable of detecting single presses, multiple simultaneous presses, and scrolling motion presses about the bezel.

27 Claims, 6 Drawing Sheets

OTHER PUBLICATIONS

Tissot; T-Touch, multifonctions User's manual; 14 pages; published prior to Mar. 26, 2008.
U.S. Appl. No. 11/218,845.
U.S. Appl. No. 11/234,370.
International Search Report from corresponding International Application No. PCT/US20008/065942, dated Nov. 28, 2008.

* cited by examiner

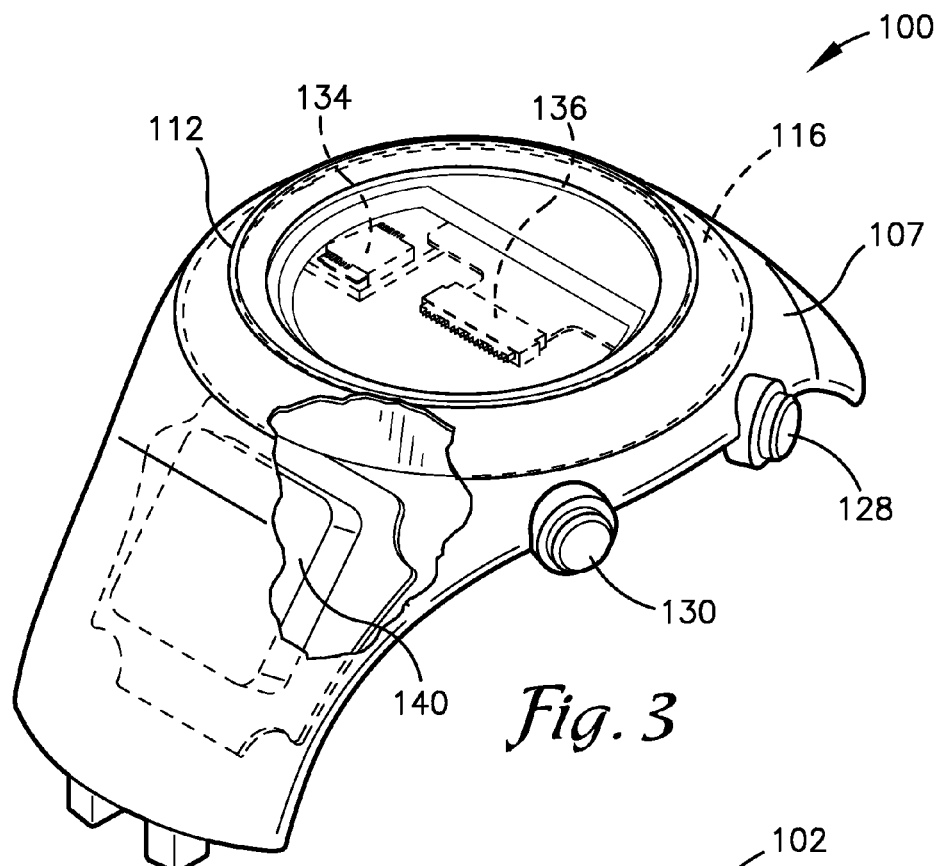
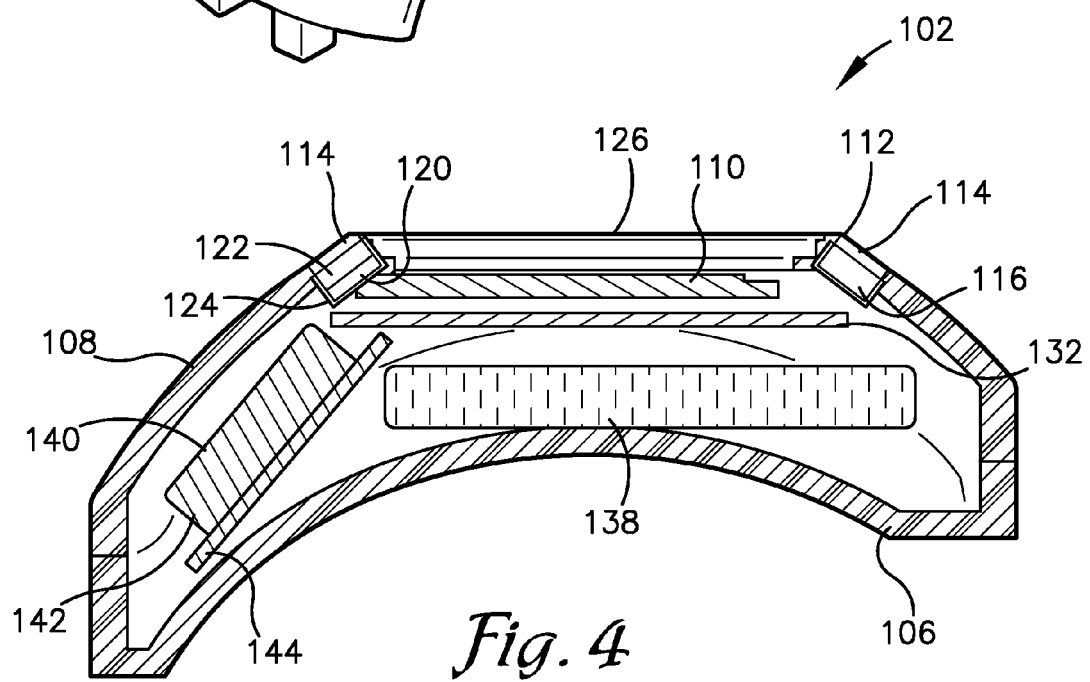

WATCH DEVICE HAVING TOUCH-BEZEL USER INTERFACE

CROSS-REFERENCE TO RELATED APPLICATIONS

The present application claims the benefit under 35 U.S.C. §119(e) of U.S. Provisional Patent Application Ser. Nos. 60/968,517, filed Aug. 28, 2007, and 61/018,647, filed Jan. 2, 2008, which are herein incorporated by reference in their entirety.

BACKGROUND

The present invention is directed to a watch device, and more particularly to a watch device having a touch-based bezel user interface for providing input of information to the watch device.

Typically, the user interfaces employed by digital watch devices consist of a segmented display disposed in the front face of the watch housing and several mechanical buttons arranged in the sides of the housing adjacent to the display. This arrangement severely limits the functionality and/or ease of use of the user interfaces of such watches since the conventional design philosophy has been either to increase the number of buttons arranged around the display, or alternately, use a lesser number of buttons but employ complex display menus for the display of information. Watches having housings which include large number of buttons can intimidate users, while watches which use a large number of display menus can be confusing to use. For smart watches such as personal training devices and personal navigational watches, which may be connected and can retrieve and display data quickly and efficiently, the present arrangement is especially limiting. Watch interfaces are further limited because it is usually desirable that they be small, sleek and stylish. These requirements physically limit the number of buttons that can be placed on the housing.

SUMMARY

The present invention is directed to a watch device having a user interface employing a sensor positioned within the bezel of the display for detecting when the bezel is touched by a user of the watch device. In exemplary embodiments, the sensor may be capable of detecting both single presses as well as scrolling motion presses about the bezel. In this manner, an intuitive user interface is provided that that is not possible with discrete mechanical switches or any known watch input technology or combination thereof.

In one specific implementation, the watch device includes a housing. A wristband is coupled to the housing for holding the housing to the wrist of a user of the watch device. A display is disposed in the housing for displaying information to the user and a bezel is disposed in the housing so that the bezel at least partially surrounds the display. The bezel includes a sensor for sensing when the bezel is touched so that the user of the watch device may provide an input to the watch device by touching the bezel.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are exemplary and explanatory only and are not necessarily restrictive of the invention claimed. The accompanying drawings, which are incorporated in and constitute a part of the specification, illustrate embodiments of the invention and together with the Detailed Description, serve to explain the principles of the invention.

BRIEF DESCRIPTION OF THE DRAWING FIGURES

Embodiments of the present invention are described in detail below with reference to the attached drawing figures, wherein:

FIG. 3 is an isometric view of the watch device shown in FIG. 1, having sections cut away for further illustrating internal components of the watch device;

FIG. 4 is a diagrammatic cross-sectional side elevational view taken through the housing of the watch device shown in FIG. 1, further illustrating the internal components of the watch device;

Figure 1:
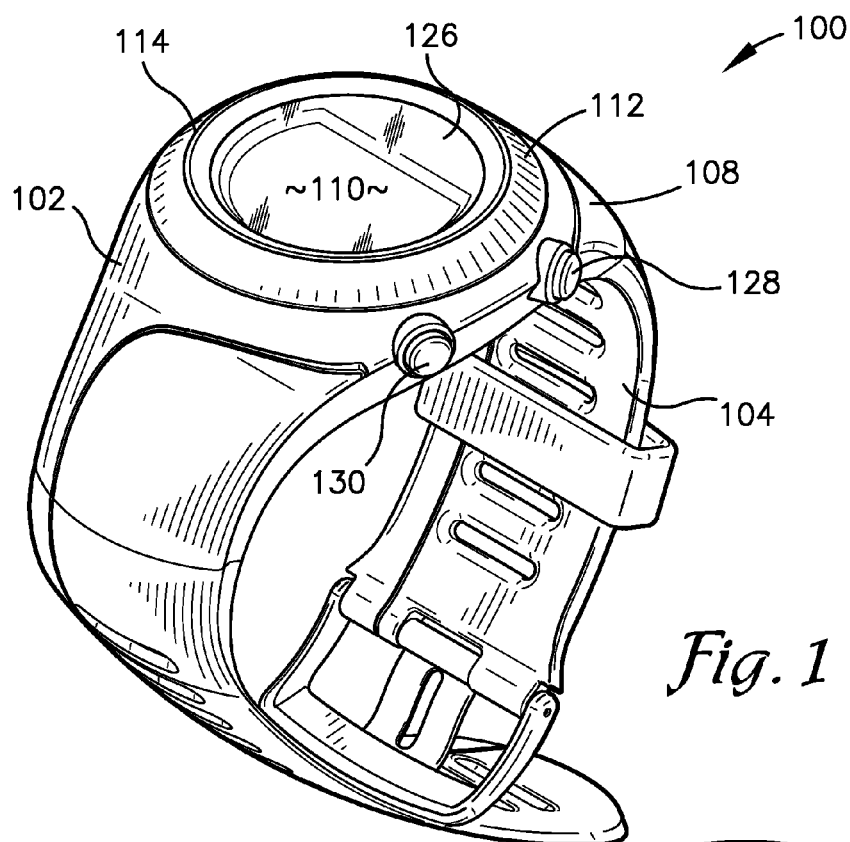
FIG. 1 is an isometric view illustrating a watch device constructed in accordance with an exemplary embodiment of the present invention.
Figure 2:
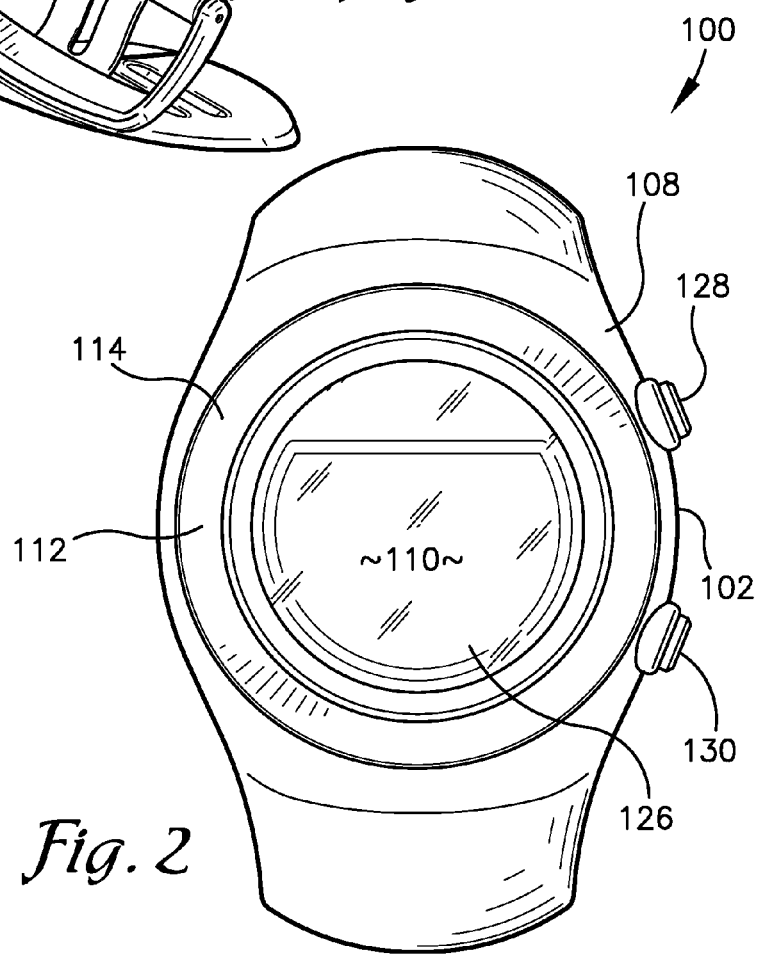
FIG. 2 is a top plan view of the watch device shown in FIG. 1, further illustrating the display and touch sensitive user interface or input device.
Figure 5:
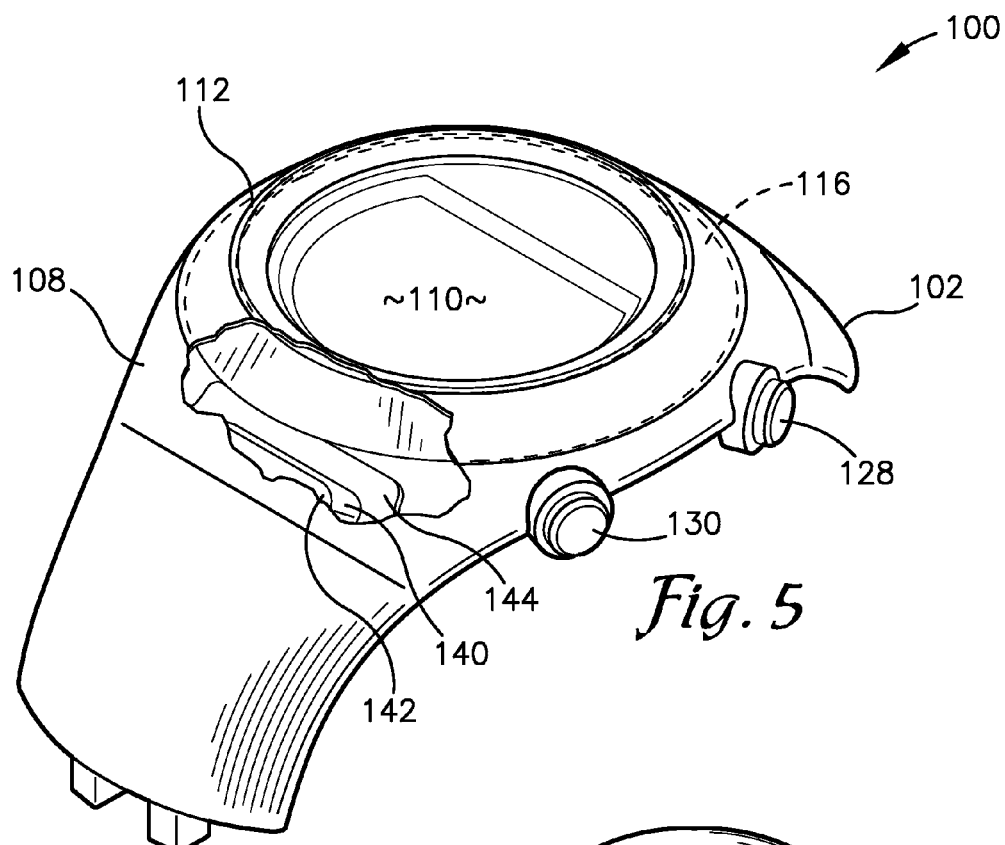
FIGS. 5 and 6 are an isometric view and a top plan view, respectfully, of the housing of the watch device shown in FIG. 1, wherein portions of the bezel and housing of the watch device are shown as being cut away to facilitate illustration of the sensor of the touch sensitive user interface.
Figure 6:
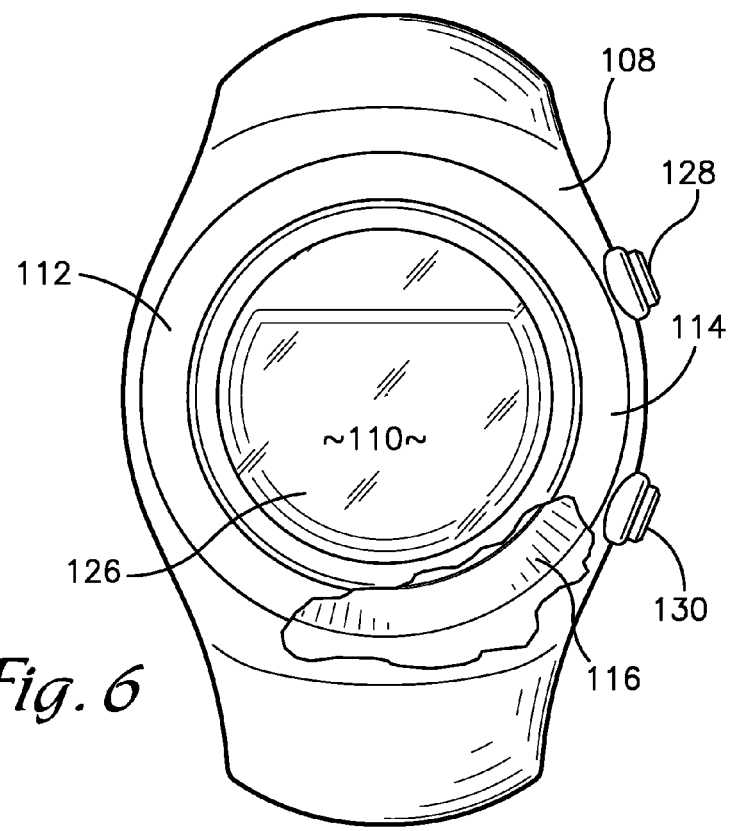

The drawing figures do not limit the present invention to the specific embodiments disclosed and described herein. The drawings are not necessarily to scale, emphasis instead being placed upon clearly illustrating the principles of the invention.

DETAILED DESCRIPTION

The detailed description is described with reference to the accompanying figures. The use of the same reference numbers in different instances in the description and the figures may indicate similar or identical items.

Digital watch devices typically employ user interfaces comprised of a display disposed in the front face of the watch housing. Several mechanical buttons are arranged in the sides of the housing adjacent to the display. These buttons are used to input information into the watch device and to control the display of information by the watch device via the display. For smart watches such as personal training devices and personal navigational watches, which may be connected and can retrieve and display data quickly and efficiently, the present arrangement is especially limiting. Such watches may have a display capable of displaying several different screens or menus for providing information and/or facilitating data entry. Consequently, such watches may require housings which include large number of buttons. However, it is highly desirable that such sport watches be small, sleek and stylish. This physically limits number of buttons that can be placed on the device and other mechanical input devices are large and unreliable.

Accordingly, the present invention is directed to a watch device having a user interface employing a sensor positioned within the bezel of the display for detecting when the bezel is touched by a user of the watch device. The bezel and sensor completely or at least substantially surround the display. In exemplary embodiments, the sensor comprises a flex or capacitive sensor. The flex sensor is located beneath a plastic or metal bezel making it a robust, reliable and stylish replacement for the mechanical buttons common in prior watch devices. In exemplary embodiments, the sensor may be capable of detecting both single presses as well as scrolling motions about the bezel. In this manner, an intuitive user interface is provided that that is not possible with discrete mechanical switches or any other known watch input technology or combination thereof.

Referring generally to FIGS. 1 through 8, a watch device 100 constructed in accordance with an exemplary embodiment of the present invention is described. The watch device 100 includes a housing 102 shaped to be worn on the arm of a user (and typically on the back of the wrist of the user) which is coupled to the wrist via a wristband 104. The housing 102 generally includes a bottom surface 106 (FIG. 4), which may be shaped to fit against the user's wrist and a top surface 108 generally facing away from the bottom surface 104 and wrist. A display 110 is disposed in the top surface 108 so that it may be viewed by a user of the watch device 100 while the watch device 100 is worn on the wrist of the user. In embodiments, the display 110 may comprise a segmented display and may employ a liquid crystal display (LCD), light emitting diode (LED) display, polymer light emitting diode display (PLED), or any like display employing thin screen display technology.

In the embodiment illustrated, the display 108 is surrounded by a touch sensitive user interface 112. The user interface 112 includes a generally ring-shaped bezel 114 which aesthetically unites the display 110 to the top surface 108 of the housing 102. The bezel 114 may be formed of metal or plastic and, in specific implementation may be joined to the housing in a water-resistant or water-proof manner to prevent the intrusion of fluids into the housing.

As shown in FIGS. 3 through 6, a ring shaped touch-sensitive sensor 116 is disposed beneath the bezel 110. In embodiments, the sensor 116 may have the capacity to detect both single presses as well as scrolling motion presses. In this manner, the touch sensitive user interface 112 may be used for entering information as one or more "single buttons" or as a "rotary dial."

Figure 7A:
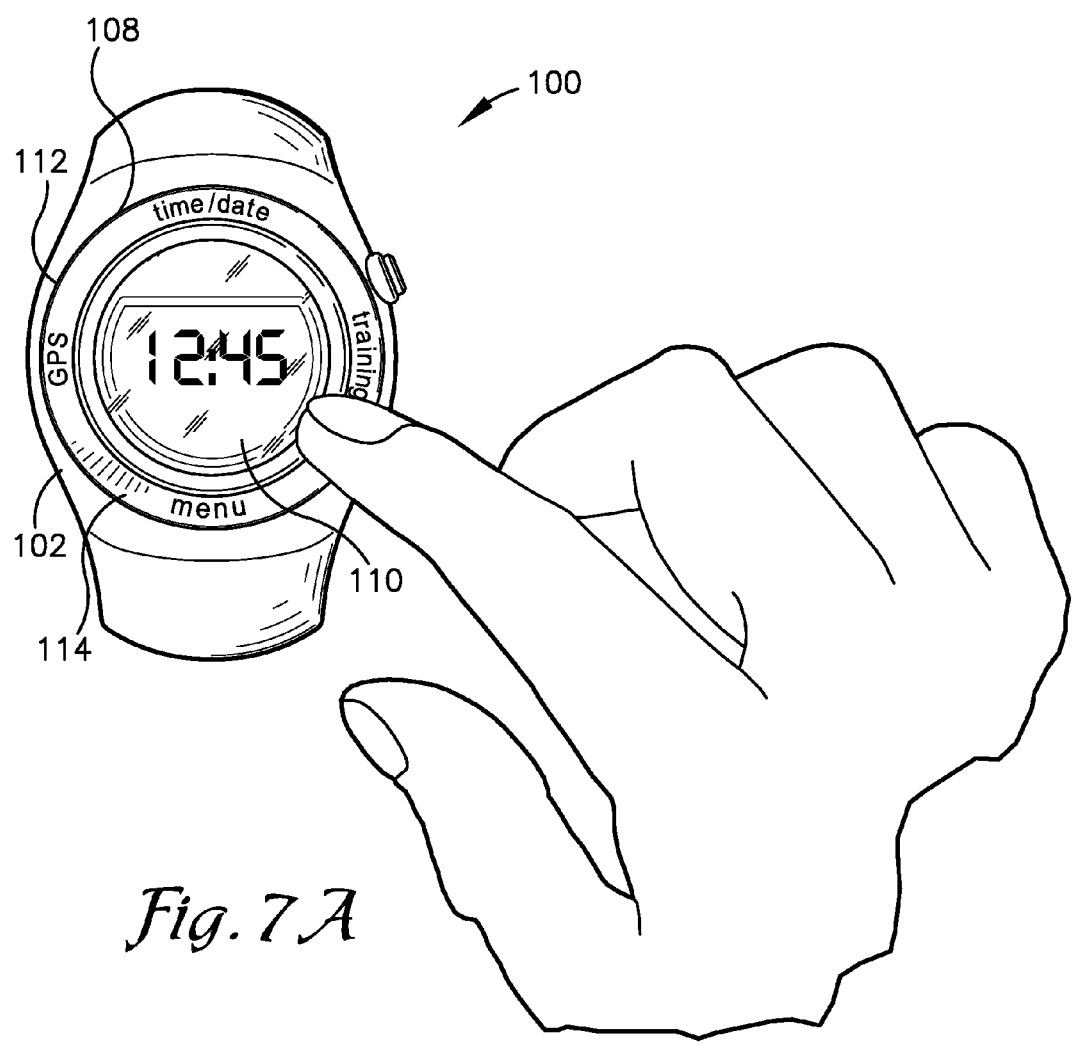
FIGS. 7A and 7B are top plan views of the watch device shown in FIG. 1, further illustrating a user utilizing the bezel for input of information.
Figure 8:
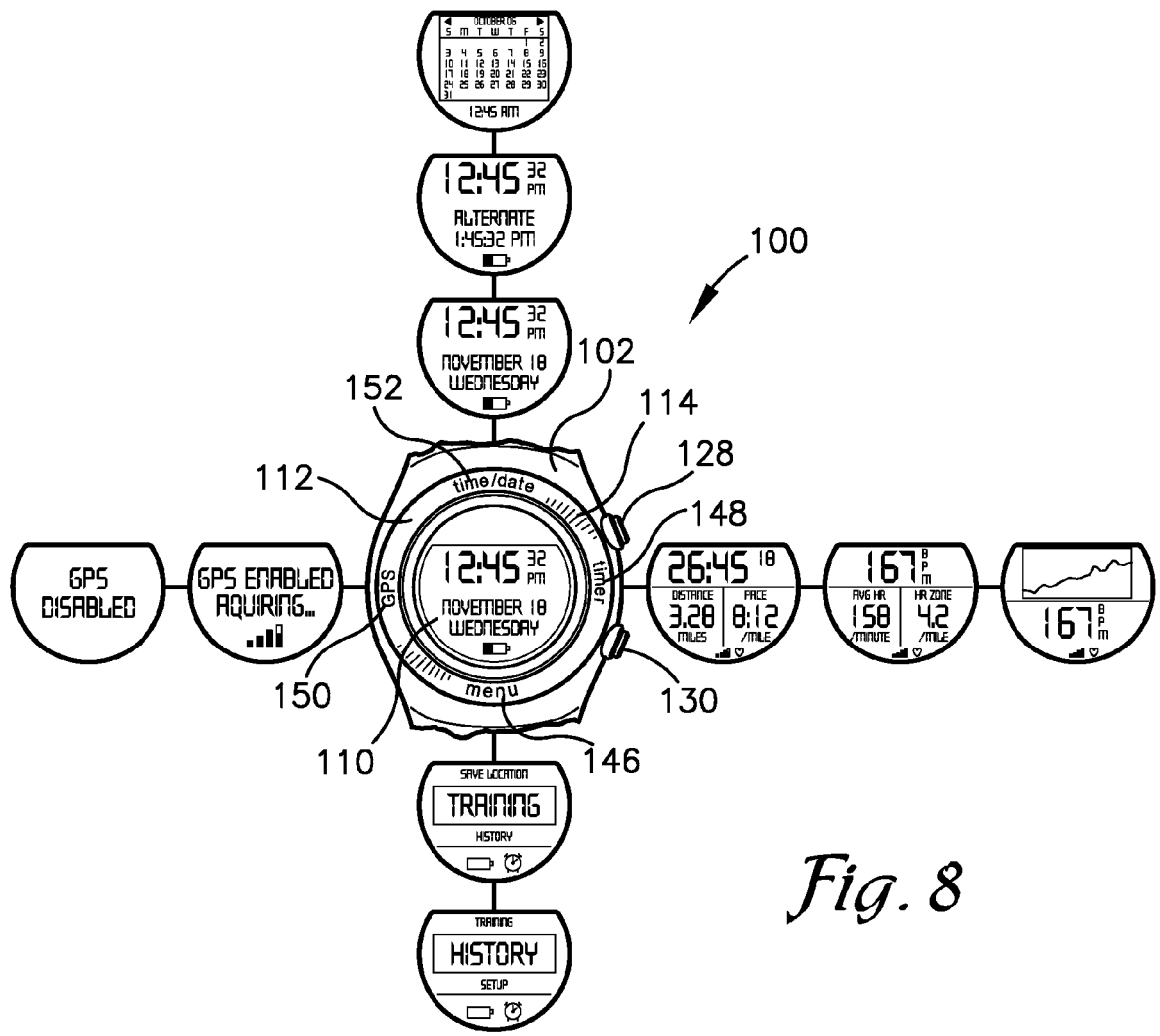
FIG. 8 is a diagrammatic view illustrating use of the user interface or input device of the present invention to scroll through menus displayed by the display of the watch device in accordance with an exemplary embodiment of the present invention.

As shown in FIG. 7A, the sensor 116 may be capable of sensing single touches by a user's fingertip at a plurality of discrete locations about the circumference of the bezel 114. For example, as shown in FIG. 7A, the touch sensitive user interface 110 may also function to provide single discrete areas which act as "buttons" and which are "depressed" or actuated by the user by touching a portion of the bezel 114 within the area. For example, in the embodiment illustrated, the watch device 100 may employ a bezel 114 having four discrete positions marked "menu," "training," "GPS," "time/date," or the like. These discrete regions are activated by a user touching that portion of the bezel 114 corresponding to the region (i.e., by touching the bezel 114 where marked (e.g., "menu," "training," "GPS," "time/date," etc.) FIG. 8 illustrates the access of typical modes employed by an exemplary watch device 100. Such modes may include a time mode (or watch mode), a timer mode, a menu mode and a GPS mode.

In embodiments of the invention, the touch sensitive user interface 110 may be capable of sensing single presses comprising a momentary press or "tap" and/or a longer press or "press-and-hold." For example, in one embodiment, the touch sensitive user interface may be capable of detecting a press or tap consisting of a press of approximately 0.5 seconds or less and a press-and-hold of approximately 1 second or more in one or more of the discrete regions (e.g., "menu," "training," "GPS," "time/date") and providing a different response depending on whether the detected press was a tap or a press-and-hold.

The sensor 116 may further be capable of detecting multiple (e.g., two or more) simultaneous touches at discrete locations about the circumference of the bezel. For example, the sensor 116 may be configured to accept an input consisting of simultaneous touches at two different locations on the bezel 114 (e.g., by the user's forefinger and thumb). In exemplary embodiments, a multiple touch press may utilized to activate a feature which would not otherwise be activated by a single touch. Exemplary features that may be activated by a multiple touch include, turning on a backlight for the display 110, taking the watch device 102 out of a sleep or low power consumption mode, or the like.

Figure 7B:
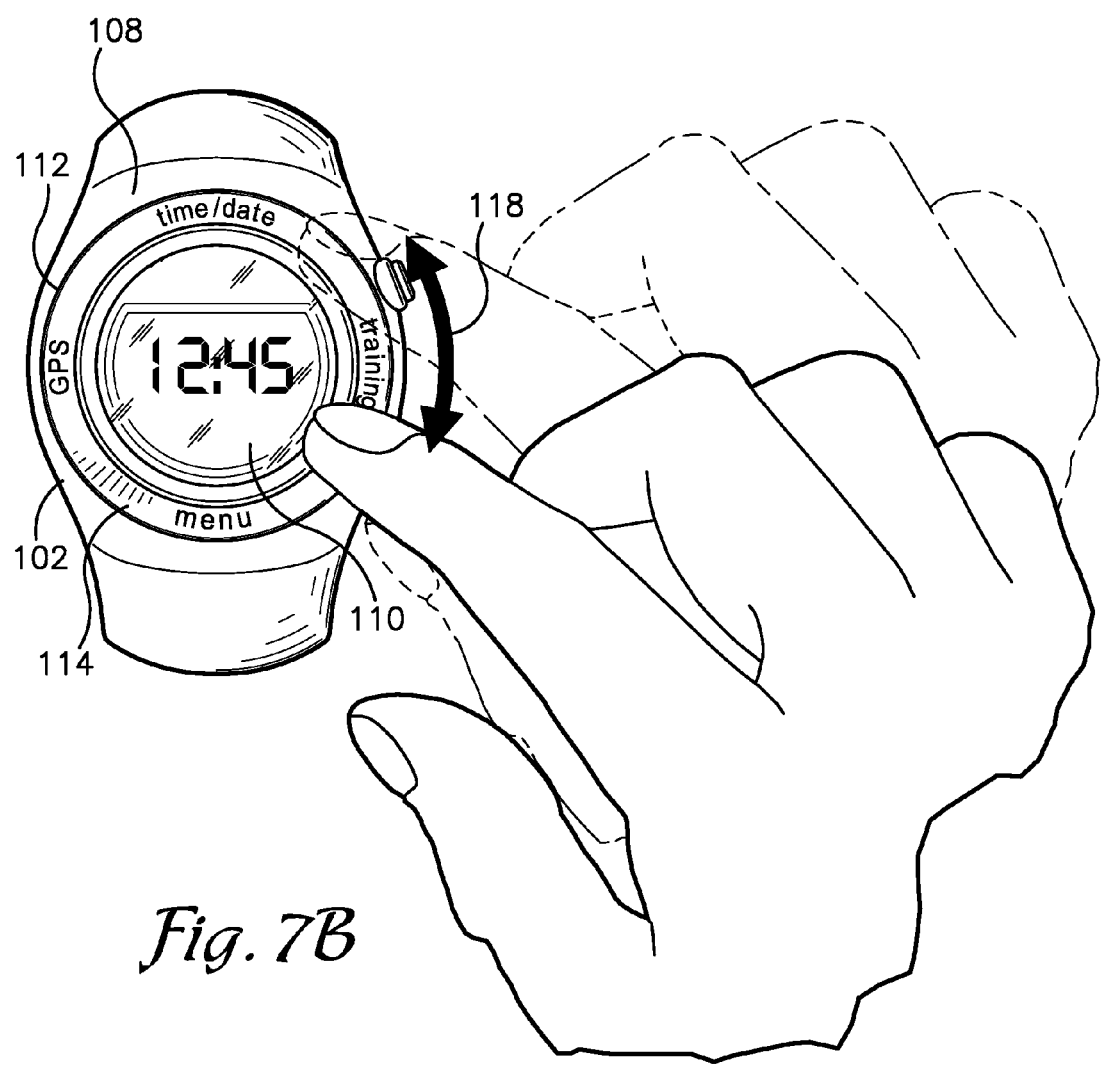

The touch sensitive user interface 110 may also be used as a rotary dial for accessing modes, scrolling through lists for viewing or entering data, and for adjusting settings of the watch device 100. Such tasks have heretofore been extremely cumbersome using mechanical buttons alone in conventional watch devices. As shown in FIG. 7B, the sensor 116 may additionally, or alternatively, have the capacity to detect scrolling motion presses. A user accomplishes a scrolling motion press by first touching the bezel 114 at a discrete location with his or her finger (or thumb), then without lifting his or her finger, sliding his or her finger for a distance along the circumference of the bezel 114 (as indicated by arrow 118) while maintaining contact between the finger and the surface of the bezel 114. In exemplary embodiments, the user may slide his or her finger in either the clockwise or counter-clockwise direction. The user may then lift his or her finger from the surface of the bezel 114 to complete the scrolling motion press, or alternatively, slide his or her finger further along the circumference of the bezel 114 in the original direction or in the opposite direction (e.g., clockwise or counter-clockwise) to continue the scrolling motion press.

In embodiments of the invention, the sensor 116 may comprise a capacitive sensor capable of detecting single presses (including tap and/or press-and-hold presses) by the user's fingertip, finger, thumb, or the like, and multiple simultaneous presses, as well as scrolling motion presses. For example, in specific embodiments, the sensor 116 comprises a capacitive flex sensor 118 which detects changes in capacitance when a user touches the surface of the bezel 114. In this embodiment, the capacitive sensor 118 includes a flex circuit 120 having sensor pads 122 and an integrated circuit 124. When a user touches the bezel 114 with his or her fingertip (or other conductive object) the electric field around one or more of the sensor pads 122 is changed. The integrated circuit 124 detects changes in capacitance on the pads 122 and outputs the position of the finger on the bezel 114 as detected by the sensor 118. The duration of each press may be determined or monitored from the output of the integrated circuit 124. In such embodiments, the capacitive sensor 118 may have a resolution of a number of fixed discrete positions about its circumference (e.g., in one specific embodiment, a capacitive sensor having at least approximately 128 discrete locations is employed).

When a scrolling motion press is made (as shown in FIG. 7B) the capacitance around successive sensor pads 122 is changed by the user's fingertip as his or her fingertip slides around the circumference of the bezel 114. The capacitive sensor 118 may have no moving parts and can be protected from impingement by liquids and other foreign object beneath the bezel 114. While a capacitive flex sensor is shown specifically in the drawings and discussed herein, it is contemplated that other touch based sensor technologies (e.g., resistive, etc.) may be utilized.

In FIGS. 1 through 8, the user interface 112 is illustrated which employs a generally ring-shaped bezel 114 and sensor 116. However, it is contemplated that the one or both of the bezel 114 and sensor 116 may have other shapes without departing from the scope and intent of the present invention. For example, in embodiments of the invention, the user interface 112 may comprise a bezel 114 and sensor 116 that are more squared, rectangular, triangular, or which may have another geometric or curvilinear shape. Similarly, the user interface 112 may employ a bezel 114 and or sensor 116 which do not completely surround the display 110. For example, in embodiments of the invention, the bezel 114 and/or the sensor 116 may be generally C or U shaped so that the bezel 114 and/or the sensor 116 do not completely surround the display 110, comprised two C-shaped regions positioned on either side of the display 110, comprised of two or more curvilinear segments spaced around the display 110, or the like. Additionally, it will be appreciated that the capacitive sensor of the watch device illustrated in FIGS. 1 through 8 may extend into other areas of the housing 102 such as the display 110 thereby providing, for example, a touch screen for the watch device 100. Alternatively or additionally, the capacitive sensor 118 or, alternatively a second capacitive sensor, could also be used for proximity sensing. In such embodiments, the sensor could detect when the user has put the watch device 100 onto or removed the watch device 100 from his or her wrist or arm. The watch device 100 could then automatically turn itself on, turn itself off, or switch modes of operation.

In exemplary embodiments, the display 110 may include a generally transparent lens crystal 126 for covering and protecting the internal electronic components (e.g., LCD, LED, PLED, circuit board, etc.) of the display 110. The bezel 114, crystal 126, and housing 102 and the joints or connections there between may be made substantially waterproof or water-resistant to prevent the intrusion of liquids and other foreign objects within the housing 102.

In embodiments, the watch device 100 may further include one or more mechanical buttons (two mechanical buttons 128 & 130 are illustrated) disposed adjacent to the bezel 114 in the housing 102. In exemplary embodiments, the mechanical buttons 128 & 130 may be used to control commonly used function of the watch device 100. For example, in one specific embodiment wherein the watch device comprises a sports watch, the buttons 128 & 130 may be used to control functions that are most commonly used while running (e.g. start/stop for a timer or stopwatch, enter, lap/reset, quit, etc.). In embodiments, the combination of mechanical buttons 128 & 130 and the touch sensitive user interface 112 enhances the functionality, flexibility and reliability of the watch device 100. For example, in one specific embodiment, the touch sensitive user interface 112 may be used to scroll menus for display by the display while the buttons 128 & 130 may be used to select items within the menus.

As shown in FIGS. 3 and 4, the watch device 100 may include one or more printed circuit boards 132 which may support a processing system 134, a location determining component 136, memory, an accelerometer, wireless transmission components (e.g., cellular, BLUETOOTH™, ANT™, IEEE 802.11 (WiFi), etc.), and the like. The housing 102 may also enclose an antenna assembly 134 for the location determining component. A battery 138 provides electrical power to operate the watch device. The housing 102 encloses and protects these internal components from environmental contaminants, moisture, vibration, impact, and the like.

The processing system 134 may include any number of processors, controllers, or other processing systems and resident or external memory for storing data and other information accessed and/or generated by the watch device 100. The processing system implements one or more software programs which control the display of information on the display 108 and input of information via the touch sensitive user interface 112 and mechanical buttons 128 & 130.

In exemplary embodiments, the location determining component 136 comprises a global positioning system (GPS) receiver. The location determining component may alternatively be a receiver suitable for use with another Global Navigation Satellite system (GNSS) or any other device which can determine locations of the watch device 100. Where a GPS receiver is employed as the location determining component, the GPS receiver may be operable to receive navigational signals from GPS satellites to calculate a position of the watch device 100 as a function of the signals. In exemplary embodiments, the location determining component may also be operable to calculate a route to a desired location, provide instructions to navigate to the desired location, display maps and other information on the display 110, and to execute other functions described herein.

The location determining component 136 may include one or more processors, controllers, or other processing systems and memory or may utilize the components of the processing system. In exemplary embodiments, the memory of the processing system and/or the location determining component may store cartographic data and routing used by or generated by the location determining component. The memory may be integral with the location determining component, integral with the processing system, stand-alone memory, or a combination of both. The memory may include, for example, removable and non-removable memory elements such as RAM, ROM, flash and/or other conventional memory elements.

The antenna assembly 140 is configured and strategically mounted and positioned to optimize reception of external radio frequency signals (e.g., transmitted from the GPS Satellites while minimizing the overall size of the watch device 100 and eliminating protrusions from the housing 102 of the device 100). In the embodiment illustrated, the antenna assembly 140 comprises a patch antenna 142 having a circuit board ground plane 144. However, it is contemplated that other antenna types and configurations may be used without departing from the scope and intent of the present invention.

The display 110 is coupled with the processing system 134 and the location determining component 136 for displaying data and information as described herein. The display 110 may comprise an LCD (Liquid Crystal Diode), TFT (Thin Film Transistor) LCD, LEP (Light Emitting Polymer or PLED (Polymer Light Emitting Diode), or the like, capable of displaying text and graphical information. The display 110 may be backlit via a backlight such that it may be viewed in the dark or other low-light environments. As illustrated in FIG. 1, the display 110 is preferably positioned on a front face of the housing 102 for ease of viewing.

The watch device 100 may function in various operating modes, such as an exercise mode that calculates exercise-related information for the wearer based on the locations determined by the location determining component, a navigation mode that calculates navigation routes and other information using locations determined by the location determining component, a calendar mode operable to store and indicate scheduled events such as races and exercise schedules, and a watch mode that may provide basic timekeeping functionality such as the time of day, the date, the year, alarms, and the like. In some embodiments, the exercise mode may provide the performance-monitoring functionality disclosed in U.S. Pat. Nos. 6,837,827, 7,085,678, and 7,057,551 (each of which are incorporated herein by reference) and/or that employed by the Garmin® Forerunner® line of products. As should be appreciated, the watch device 100 may present any number of operating modes and it is not limited to using the exemplary modes discussed above.

FIG. 8 illustrates use of the user interface 112 of the present invention to scroll through menus displayed by the display 110 of the watch device 100, for example, to access various operating modes, set preferences, or the like. In embodiments of the invention, the watch device 100 may comprise a GPS-enabled sports watch which may provide information such as time of day, date, time zone, alarms, countdown and count up timers, calendar, GPS control functions, lap information, position information, battery life display, virtual partner information, heart rate, pulse rate, and the like In the embodiment illustrated, the user interface 112 employs a bezel 114 having four discrete positions marked "menu" 146 "training" 148 "GPS" 150 and "time/date" 152 These discrete regions are activated by a user pressing that portion of the bezel 114 corresponding to the region (i.e., by touching the bezel 114 (e.g., via a press-and-hold press) where marked (e.g., "menu" 146, "training" 148, "GPS" 150 "time/date" 152 etc.) causing the watch device 100 to access a desired mode (e.g., a time mode (or watch mode), a timer mode, a menu mode and a GPS mode, respectively). The user may then utilize single presses (e.g., tap or press-and-hold presses), multiple presses, and scrolling motion presses to scroll through menus within each mode as desired. Thus, for example, the user may use a single press to access the GPS mode and then scroll through menu or screens to turn the GPS receiver on or off and/or to provide information about GPS satellite acquisition. Similarly, the user may use a single press to access the timer mode and then use additional single presses (e.g., taps) or, alternatively, scrolling motion presses to scroll through menus or screens to access stop watch functions, display heart rate information received from a remote heart rate monitor via a wireless connection (e.g., Bluetooth, ANT, etc.) such as the user's heart rate in beats per minute (BPM) or a page containing a graphical display of the history of the user's heart rate over a time period. The menu and time modes may be accessed in a like manner.

In embodiments, the watch device 100 may be capable of receiving and displaying information (e.g., training parameters, location, etc.) about other persons (e.g., other runners in a race, training partners, etc.) via a wireless link with watch devices 100 worn by those persons, a wireless server device, or the like. In such embodiment, the user interface 112 of the present invention may be used to control the presentation of this information via the display 110.

The watch device 100 may be capable of displaying information about a virtual person such as a virtual training partner (i.e., fictitious person whose information is generated by the watch device 110 or received from an outside source (e.g., via a wireless or wired connection). In such embodiments, the processing system 136 may determine a first training parameter (e.g., speed, location, heart rate, etc.) for the user of the watch device 100. The processing system 136 may then calculate a second training parameter (e.g., speed, location, heart rate, etc.) for the virtual training partner. The processing system 136 may then cause the first and second training parameters to be displayed by the display 110. The virtual training partner may be used by the user as a comparison for his or her own performance. In accordance with the present invention, the user interface 112 may be used to adjust the second training parameter via a scrolling motion press on the bezel 114. For example, training parameters for the virtual training partner such as speed, heart rate, and the like, may be increased via a clockwise scrolling motion press or decreased via a counterclockwise scrolling motion press.

To conserve and prolong the battery life of the watch device 100, the location determining component, and/or components associated therewith such as the GPS receiver, may be disabled when the watch device 100 is not set in the exercise mode, navigation mode, or any other mode that actively utilizes GPS. Thus, for example, when the watch device 100 is set in watch mode, the location determining component may be disabled.

Further, while in the exercise mode, the processing system 134 of the watch device 100 may monitor the performance of the wearer to determine if the location determining component should be disabled. For example, the watch device 100 may "time out" if the wearer does not move a predetermined distance within a predetermined time period. Upon timing out, the watch device 100 may revert to the watch mode or other non-GPS mode or remain in exercise mode with the location determining component disabled. As another example, the watch device 100 may prompt the user for an input if it determines that the user is not exercising and then disable the location determining component based on the wearer input or the lack of wearer input.

In some embodiments, the watch device 100 may utilize one or more sensors, such as the touch-sensitive sensor discussed above, an accelerometer, an infrared sensor, a heat sensor, or the like, to determine if the wearer is currently wearing the watch device 100. For example, the touch-sensitive sensor may sense various electrical properties of the human body to determine if the watch device 100 is currently being worn, the accelerometer may detect movement of the watch device 100 to determine its wear status, and the infrared sensor and heat sensor may detect heat associated with the human body as compared to background radiation to determine if the watch is being worn. If the watch device 100 determines it is not currently being worn, it may disable the location determining component.

In some embodiments, the watch device 100 may provide various power management functions based on information associated with the calendar mode. For example, the watch device 100 may provide charging reminders to the wearer to remind the wearer to recharge the battery before a scheduled race, exercise routine, or other event where the location determining component is likely to be used. The processing system 134 of the watch device 100 may also selectively disable the location determining component, such as by reverting to watch mode, when an exercise-related event is not scheduled within the calendar mode, or automatically enable the location determining component, such as by entering the exercise mode, at the time at which an event is scheduled to start. Such functionality enables the watch device 100 to quickly provide performance-monitoring functionality when the wearer begins to exercise.

Although the invention has been described with reference to exemplary embodiments illustrated in the attached drawing figures, it is noted that equivalents may be employed and substitutions made herein without departing from the scope of the invention as recited in the claims. Further, the watch device 100 and its components illustrated and described herein are merely examples of a device and components that may be used to implement the present invention and may be replaced with other devices and components without departing from the scope of the present invention.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A watch device, comprising:
   a housing;
   a wristband coupled to the housing for holding the housing to the wrist of a user of the watch device;
   a display disposed in the housing for displaying information to the user;
   a backlight operable to illuminate at least a portion of the display; and
   a bezel substantially surrounding the display, the bezel including a ring-shaped capacitive flex sensor for sensing when the bezel is touched, the sensor substantially surrounding the display,
   wherein the backlight is operable to be activated in response to simultaneous touches of any two points on the bezel.

2. The watch device as claimed in claim 1, wherein the capacitive sensor comprises a flex circuit and a plurality of sensor pads.

3. The watch device as claimed in claim 1, further comprising a processing system for determining a first training parameter for the user of the watch device and calculating a second training parameter for a virtual training partner, the first and second training parameters being displayed by the display, wherein the second training parameter may be adjusted in response to a scrolling motion press on the bezel.

4. The watch device as claimed in claim 1, wherein the display is operable for displaying a plurality of display screens, and where at least one of the display screens displayed is selectable using the bezel.

5. The watch device as claimed in claim 1, wherein the sensor is operable for detecting scrolling motion presses on the bezel.

6. The watch device as claimed in claim 5, wherein the sensor is operable for detecting single presses on the bezel.

7. The watch device as claimed in claim 5, wherein the sensor has a resolution of at least approximately 128 touch positions.

8. The watch device as claimed in claim 1, further comprising a button disposed on the housing adjacent to the bezel, the button for being actuated to provide input to the watch device.

9. The watch device as claimed in claim 8, wherein the button is operable for providing input to the watch device in cooperation with the sensor.

10. The watch device as claimed in claim 1, further comprising a position determining component disposed within the housing for determining a geographic position of the watch device.

11. The watch device as claimed in claim 10, wherein the position determining component comprises a global positioning system (GPS) receiver and an antenna.

12. A watch device, comprising:
    a housing having an upper surface and a bottom surface;
    a wristband coupled to the housing for holding the housing to the arm of a user of the watch device so that the bottom surface generally rests against the arm;
    a processing system disposed in the housing for processing information;
    a display disposed in the upper surface of the housing for displaying information to the user;
    a backlight operable to illuminate at least a portion of the display; and
    a bezel disposed in the housing so that the bezel substantially surrounds the display, the
    bezel including a ring-shaped capacitive flex sensor for sensing when the bezel is touched and providing an input to the processing system, the sensor substantially surrounding the display and including a flex circuit and a plurality of sensor pads,
    wherein the backlight is operable to be activated in response to simultaneous touches of any two points on the bezel.

13. The watch device as claimed in claim 12, further comprising a position determining component disposed within the housing for determining a geographic position of the watch device.

14. The watch device as claimed in claim 12, further comprising the processing system for determining a first training parameter for the user of the watch device and calculating a second training parameter for a virtual training partner, the first and second training parameters being displayed by the display, wherein the second training parameter may be adjusted in response to a scrolling motion press on the bezel.

15. The watch device as claimed in claim 12, wherein the position determining component comprises a global positioning system (GPS) receiver and an antenna.

16. The watch device as claimed in claim 12, wherein the display is operable for displaying a plurality of display screens, and where at least one of the display screens displayed is selectable using the bezel.

17. The watch device as claimed in claim 12, wherein the sensor is operable for detecting scrolling motion presses on the bezel.

18. The watch device as claimed in claim 17, wherein the sensor is operable for detecting single presses on the bezel.

19. The watch device as claimed in claim 17, wherein the sensor has a resolution of at least approximately 128 touch positions.

20. The watch device as claimed in claim 12, further comprising a button disposed on the housing adjacent to the bezel, the button for being actuated to provide input to the watch device.

21. The watch device as claimed in claim 20, wherein the button is operable for providing input to the watch device in cooperation with the sensor.

22. A watch device, comprising:
    a housing;
    a wristband coupled to the housing for holding the housing to the wrist of a user of the watch device;
    a display disposed in the housing for displaying information to the user;
    a backlight operable to illuminate at least a portion of the display; and
    a bezel at least partially surrounding the display, the bezel including a capacitive sensor for sensing when the bezel is touched,
    wherein the backlight is operable to be activated in response to simultaneous touches of any two points on the bezel.

23. The watch device as claimed in claim 22, wherein the sensor has a resolution of at least approximately 128 touch positions.

24. The watch device as claimed in claim 22, further comprising a button disposed on the housing adjacent to the bezel, the button for being actuated to provide input to the watch device.

25. The watch device as claimed in claim 24, wherein the button is operable for providing input to the watch device in cooperation with the sensor.

26. The watch device as claimed in claim 22, further comprising a position determining component disposed within the housing for determining a geographic position of the watch device.

27. The watch device as claimed in claim 26, wherein the position determining component comprises a global positioning system (GPS) receiver and an antenna.

* * * * *